Jan. 16, 1968  L. G. R. ENGBERG  3,363,708
STEERING DEVICE FOR A COMBAT VEHICLE
Filed Oct. 22, 1965  2 Sheets-Sheet 1
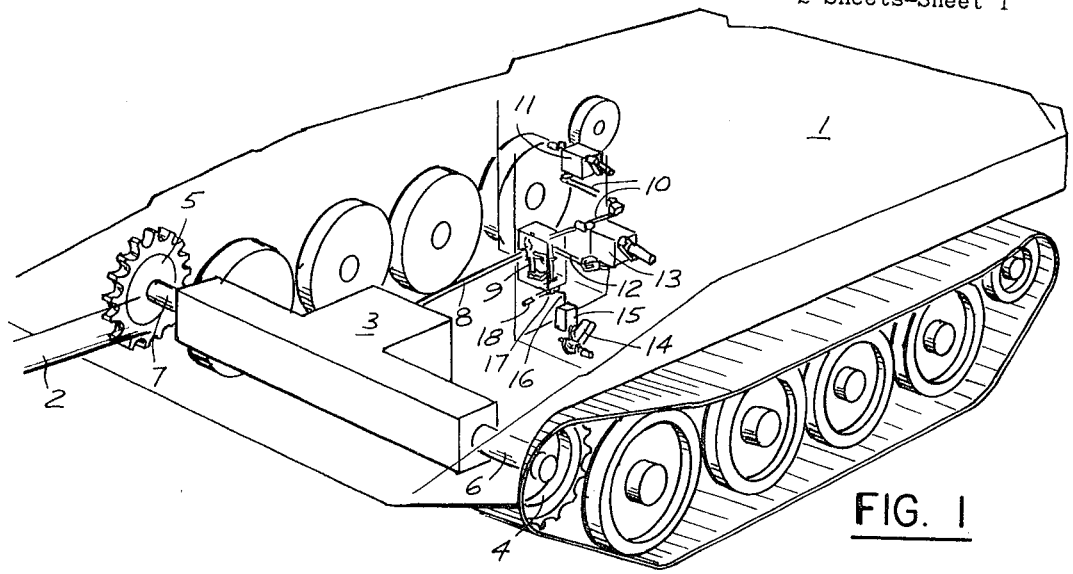
FIG. 1
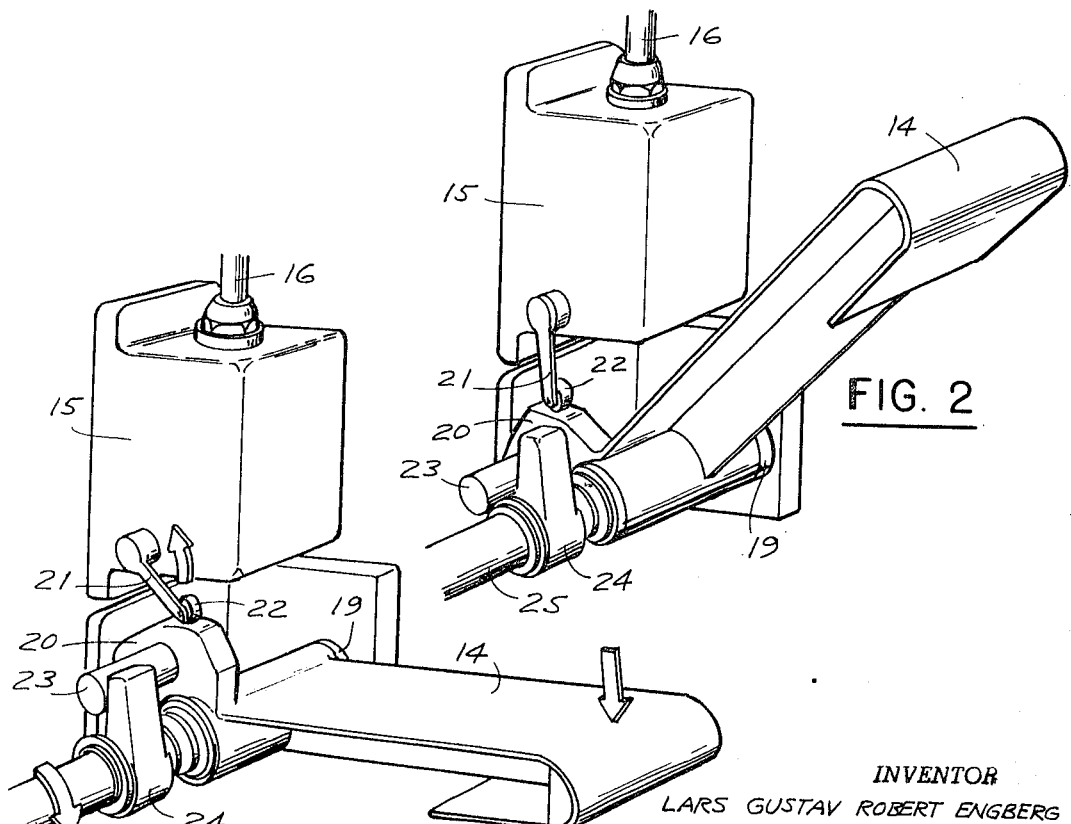
FIG. 2
FIG. 3
INVENTOR
LARS GUSTAV ROBERT ENGBERG
BY Hane and Nydick
ATTORNEYS Jan. 16, 1968  L. G. R. ENGBERG  3,363,708
STEERING DEVICE FOR A COMBAT VEHICLE
Filed Oct. 22, 1965

INVENTOR
LARS GUSTAV ROBERT ENGBERG
BY Hane and Nydick
ATTORNEYS

United States Patent Office 3,363,708
Patented Jan. 16, 1968

3,363,708
STEERING DEVICE FOR A COMBAT VEHICLE
Lars Gustav Robert Engberg, Karlskoga, Sweden, assignor to Aktiebolaget Bofors, Bofors, Sweden, a Swedish corporation
Filed Oct. 22, 1965, Ser. No. 501,127
Claims priority, application Sweden, Dec. 15, 1964, 15,146/64
9 Claims. (Cl. 180—6.2)

ABSTRACT OF THE DISCLOSURE

A steering device for a combat vehicle mounting a weapon such as a military tank with a gun fixedly mounted thereon the steering of which can be controlled either by means of a main steering control or of an auxiliary steering control and which permits shifting from one control to the other without requiring preceding manipulative steps.

Figure 4:
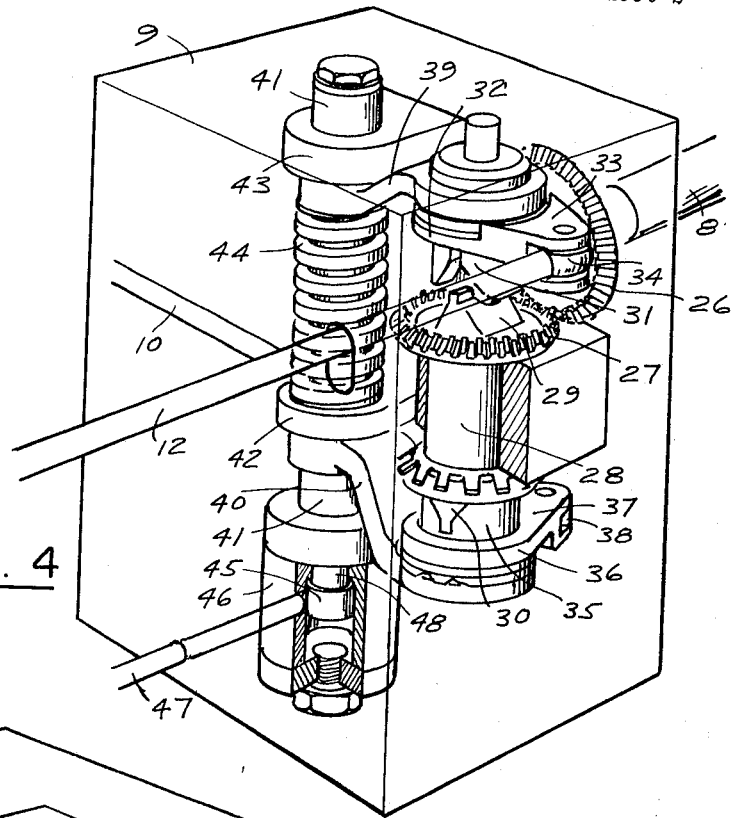

The present invention relates to a steering device for a combat vehicle, such as an assault tank, and particularly, for a combat vehicle, such as a weapon carrier, on which a gun or other missile propelling weapon is fixedly mounted so that training of the weapon in traverse must be effected by correspondingly turning the entire vehicle. The invention is particularly advantageous for use with track laying power driven tanks and similar weapon carriers.

With combat vehicles of the general kind above referred to, the exigencies of warfare, such as the sudden appearance of a target, make is sometimes advisable or of even crucial importance that the commander of the vehicle is able to take over rapidly the control of the vehicle.

It is a broad aspect of the present invention to provide a novel and improved steering device for a combat vehicle of the general kind above referred to which permits a rapid take-over of the control of the vehicle by the commander, or other person designated by him.

A more specific object of the invention is to provide a novel and improved steering device for a combat vehicle of the general kind above referred to which permits a take-over of the directional control of the vehicle by the commander or a person designated by him and a control of the vehicle from a centralized command position.

The aforepointed out objects, features and advantages of the invention and other objects, features and advantages which will be pointed out hereinafter are attained by providing steering means for directional control of the vehicle, main steering control means for controlling the steering means, auxiliary steering control means for controlling the steering means, and shift means coacting with both steering control means for selectively coupling either of said control means to the steering means. With a steering device of this kind, the vehicle is normally controlled by operation of the main steering control means but if, for any reason, such as the reasons previously indicated, the commander of the vehicle wants to take over control thereof, the operation of the vehicle can be switched from the main steering control means to the auxiliary steering control means by operating the shift means.

The invention further provides that the shift means are associated with fuel control means, such as a gas pedal, for controlling the fuel feed to an internal combustion engine used as power plant for driving the vehicle so that the commander or other person who wants to take over the vehicle can operate both the shift means and the fuel control means from the same command position.

The steering system according to the invention further provided directional force means which hold the main steering control means in its operational position and the auxiliary steering control means in an inactive position, and actuating means which, when initially activated, move the main steering control means out of the operational position and the auxiliary steering control means into an operational position and when further operated, operate the fuel control means of the vehicle.

The invention will be more fully described in connection with the accompanying drawing which shows an exemplification of the steering device by way of illustration and not by way of limitation.

Figure 5:
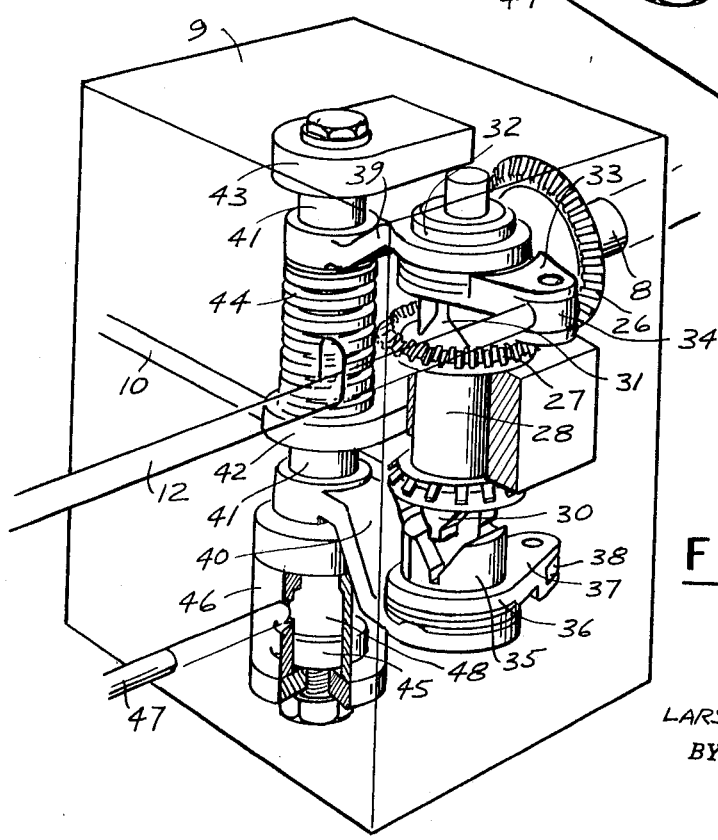

In the drawing:
FIG. 1 is a diagrammatic perspective view of a combat vehicle equipped with a steering device according to the invention;
FIG. 2 is a perspective view of parts of the steering device for selectively shifting from one steering control means to the other and also for operating the fuel control means of the vehicle;
FIG. 3 is a perspective view similar to FIG. 2 but showing the steering device parts of FIG. 2 in a different operational position;
FIG. 4 is a diagrammatic perspective view of part of the transmission means for transmitting to the steering control means of the steering device originated by the steering device parts shown in FIGS. 2 and 3; and
FIG. 5 is a diagrammatic perspective view similar to FIG. 4 but showing the transmission means in a different operational position.

Referring first to FIG. 1 in detail, this figure shows diagrammatically and only to the extent necessary for the understanding of the invention a track laying combat vehicle 1, such as an assault tank, on which a gun, indicated by its barrel 2, is mounted in fixed position with respect to its traverse position so that training of the gun in the traverse must be effected by correspondingly changing the directional position of the vehicle. The directional steering of the vehicle and with it the traverse training of the gun are effected by a steering means 3 indicated by a block. The steering means may be visualized as being conventional and it may be of the kind fully disclosed in a co-pending application entitled, A Steering Device for a Track Laying Vehicle, Ser. No. 496,498, filed Oct. 15, 1965, and assigned to the same assignee as the present application.

The steering means 3 controls two shafts 6 and 7 operatively coupled to drive gears 4 and 5, respectively, which, in turn, drive the tracks of the vehicle in a well understood and conventional manner. The steering control signals are transmitted to the steering means via a shaft 8 extending from a transmission assemblage 9 which will be more fully described hereinafter. The transmission assemblage includes a transmission means 10, such as a shaft, coupled to a steering control means 11 and a transmission means 12, such as a shaft, coupled to a steering control means 13. Steering control means 11 is a main steering control means which is normally used for control of the vehicle and steering control means 13 is an auxiliary steering control means which is normally inactive and is used under special conditions as previously indicated.

Steering control means 13 is shown to be physically and functionally associated with a suitable actuating member, such as a pedal 14 for controlling the fuel supply to the power plant of the vehicle, such as a flow of gasoline, it being assumed that the main driving force for the vehicle is supplied by an internal combustion engine (not shown).

Referring now to FIGS. 2 and 3, the gas pedal is pivotally mounted on an axle stump 19 or other suitable means and supports a cam 20 which may be integral with the pedal. The cam coacts with a cam follower 22 mounted on an actuating arm 21 of a suitable switch 15, such as a microswitch. The switch is connected in circuit, indicated at 16, with a solenoid controlled valve 17 which, in turn, controls the flow of pressure fluid through a fluid supply line 18 to a servomotor unit in transmission assemblage 9 as will be more fully explained hereinafter. The gas pedal further controls the gas feed to the power plant of the vehicle and thus the driving speed thereof. The gas feed control is indicated by a shaft 25 on which is fixedly secured a lug 24 coacting with a pin 23 laterally extending from cam 20. It should be mentioned in this connection that the gas feed control for the power plant should be visualized as being conventional, that is, turning of shaft 25 in one direction or the other increases and decreases, respectively, the fuel feed to the power plant.

A directional force means, such as a spring (not shown), biases gas pedal 14 into the position shown in FIG. 2 in which switch 15 is opened and solenoid controlled valve 17 closes the pressure fluid flow through line 18.

Turning now to FIGS. 4 and 5 showing the transmission assemblage more in detail, the main control shaft 8 terminates in a bevel gear 26 in mesh with a second bevel gear 27. Gear 27 is fixedly secured to a member 28, such as a sleeve, provided at its ends with coupling claws 29 and 30. Coupling claws 29 are engageable with coupling claws 31 and coupling claws 30 are engageable with coupling claws 35. As it is apparent, member 28, with its coupling claws 29 and 30, constitutes a receiving coupling member coacting with engaging coupling members 31 and 35. Engaging coupling member 31 is fixedly secured on a disc 32 secured to or part of a crank arm 33 which, in turn, is linked by a ball joint or other suitable joint 34 to shaft 12 leading to the auxiliary steering control means 13. Similarly, engaging coupling member 35 is secured to a disc 36 constituting part of or secured to a crank arm 37 hinged by a ball joint or other suitable joint 38 to shaft 10 leading to main steering control means 11.

Disc 32 is rotatable in an arm 39 and disc 36 is similarly rotatable in an arm 40. Both arms are fixedly secured to a rod 41 which is lengthwise slidable in bearings 42 and 43 parallel to the longitudinal axis of member 28. A loaded coil spring 44 or other suitable directional force means placed between bearings 42 and arm 39 holds rod 41 in the position shown in FIG. 4. The rod terminates at its end opposite to bearing 43 in a position 45 slidable in a cylinder 46. The cylinder and the piston constitute a hydraulic servomotor. Pressure fluid is supplied to the servomotor through a pipe 47 leading into a cylinder space 48 on the side of piston 45 facing bearing 42.

The steering device as hereinbefore described operates as follows:

As it is well known, a track laying vehicle is steered by suitably adjusting the relative speed of the tracks thereby also aiming the gun in traverse and, as previously described, such steering is normally effected with a vehicle equipped with a steering device according to the invention by operating the main steering control means 11. The gas pedal 14 is left inactive and is hence in the position shown in FIG. 2 as previously described. All the structural elements of the transmission assemblage 9 are then in the functional positions shown in FIG. 4. Accordingly, the coil spring 44 urges rod 41 and with it arms 39 and 40 secured thereto into a position in which the engaging coupling member 35 is in engagement with the coupling claws 30. Hence, any control signals reaching the transmission assemblage 9 from the main steering control means 11 via shaft 10 are transmitted to the steering control shaft 8 through member 28 and bevel gears 27 and 26. In the event any control signals should reach the transmission assemblage from the auxiliary steering control means 13 via shaft 12, such control signals will remain ineffective since coupling claws 29 and 31 are disengaged.

Let it now be assumed that for any reason, such as enemy action, the commander or a person designated by him wants to take over control of the vehicle. To do so, the person now in command depresses gas pedal 14 which should be visualized as being positioned in or near the command station. Depression of the gas pedal from the position of FIG. 2 into the position of FIG. 3 actuates switch 15 via cam follower 22 and switch arm 21 during the first part of the downward movement of the gas pedal as is indicated in FIG. 3 by an arrow. As the downward turning of the gas pedal is continued, pin 23 engages lug 24, thereby causing a turning of shaft 25 in clockwise direction, as it is also indicated by an arrow in FIG. 3. Such turning of the shaft may be visualized as increasing the fuel feed to the power plant of the vehicle.

Actuation of switch 15 operates solenoid controlled valve 17 and pressure fluid is now fed via pipes 18 and 47 into cylinder space 48. As a result, piston 45 and with it rod 41 and arms 39 and 40 secured thereto are displaced against the action of spring 44 from the position of FIG. 4 into the position of FIG. 5. At a result, coupling claws 30 and 35 are disengaged and coupling claws 29 and 31 are moved into engagement, as it is also shown in FIG. 5.

Control signals originating in the auxiliary steering control means 13 are now transmitted via shaft 12, ball joint 34, crank arm 33, disc 32 and coupling claws 31 to member 28 which, in turn, causes a corresponding rotation of steering control shaft 8 via bevel gears 27 and 26.

Any turning of shaft 12 will remain ineffective due to the disengagement of coupling claws 30 and 35.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A steering device for a combat vehicle mounting a weapon, said steering device comprising a steering means for directional control of the vehicle, a main steering control means for controlling said steering means, an auxiliary steering control means for controlling said stearing means, and shift means coacting with each said control means and operable for selectively coupling one of said control means to said steering means and uncoupling the other control means from said steering means.

2. A steering device according to claim 1 and comprising a power drive means for driving said vehicle, drive control means for controlling said power drive means, and actuating means coacting with said drive control means and said shift means, operation of said actuating means actuating said drive control means and said shift means.

3. A steering device according to claim 2, wherein a first operation of said actuating means actuates said shift means to couple said auxiliary steering control means to said steering means and to uncouple said main steering control means, and a further operation of said actuating means actuates said drive control means.

4. A steering device according to claim 3, wherein said actuating means comprises a pivotally mounted actuating member operatively connected with said shift means and both said steering control means, said actuating member in response to being pivoted through a predetermined angle operating said shift means and in response to being pivoted through a further angle operating said drive control means.

5. A steering device according to claim 4 and comprising directional force means biasing said main steering control means into coupling engagement with the steering means and said auxiliary steering control means out of coupling engagement with said steering means.

6. A steering device according to claim 1, wherein said shift means comprise a first transmission means connected to said steering means, a second transmission means connected to said main steering control means, a third transmission means connected to said auxiliary steering control means, and coupling means coupling in one coupling position said second transmission means to said first transmission means and in another coupling position said third transmission means to said first transmission means, said shift means including actuating means for selectively moving said coupling means into either one of said coupling positions.

7. A steering device according to claim 6, wherein said coupling means comprise two engaging coupling members and one receiving coupling member, each of said engaging coupling members being displaceable into and out of engagement with said receiving coupling member, one of said engaging coupling members being operatively coupled with said second transmission means and the other with said third transmission means, said receiving coupling member being operatively coupled with said first transmission means, and wherein said actuating means are coupled with said engaging coupling members for selectively moving either of said members into engagement with said receiving coupling member.

8. A steering device according to claim 7, wherein said actuating means comprise a first directional force means biasing the engaging coupling member coupled to the main stering control means into engagement with the receiving coupling member, a normally inactive second directional force means arranged to coact with the engaging coupling member coupled to said third transmission means for displacing said coupling member into engagement with said receiving coupling member and displacing said other engaging coupling member out of engagement with said receiving coupling member, and an actuating member coacting with said second directional force means to activate the same for the purposes aforesaid.

9. A steering device according to claim 8, wherein said actuating means further comprise displaceable mounting means supporting both said engaging coupling members, said mounting means being displaceable between positions in which either of said engaging coupling members is in engagement with said receiving coupling member, and wherein said first directional force means comprises spring means biasing said mounting means into a position in which the engaging coupling member coupled with the second transmission means is engaged with the receiving coupling member, and said second directional force means comprises a motor means arranged to coact with said mounting means for displacing the latter against the action of said spring means into a position in which the engaging coupling member coupled to said third transmission means is engaged with the receiving coupling member and the engaging coupling member coupled to the second transmission means is disengaged from the receiving coupling member, said motor means being operable by said actuating member.

References Cited

UNITED STATES PATENTS

| | | | |
|---|---|---|---|
| 2,328,606 | 9/1943 | Boldt | 192—13 X |
| 2,791,167 | 5/1957 | Lockmiller | 180—62 |

BENJAMIN HERSH, *Primary Examiner.*

J. A. PEKAR, *Assistant Examiner.*